(12) United States Patent
Wagner

(10) Patent No.: US 10,853,834 B2
(45) Date of Patent: *Dec. 1, 2020

(54) SYSTEM AND METHOD FOR INCENTIVIZING WIRELESS DEVICE USERS TO INTERACT WITH SPONSOR OFFERS AND ADVERTISING

(71) Applicant: Datascape.com, Inc., Atlanta, GA (US)

(72) Inventor: Richard H. Wagner, Norcross, GA (US)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/447,651

(22) Filed: Jun. 20, 2019

(65) Prior Publication Data

US 2019/0318373 A1    Oct. 17, 2019

Related U.S. Application Data

(63) Continuation of application No. 13/829,007, filed on Mar. 14, 2013, now Pat. No. 10,332,142.

(51) Int. Cl.
*G06Q 30/02* (2012.01)

(52) U.S. Cl.
CPC ..... *G06Q 30/0215* (2013.01); *G06Q 30/0207* (2013.01); *G06Q 30/0222* (2013.01); *G06Q 30/0234* (2013.01); *G06Q 30/0241* (2013.01); *G06Q 30/0253* (2013.01); *G06Q 30/0267* (2013.01)

(58) Field of Classification Search
None
See application file for complete search history.

(56) References Cited

U.S. PATENT DOCUMENTS

| 7,054,830 | B1 | | 5/2006 | Eggleston et al. |
| 8,185,597 | B1 | * | 5/2012 | Cumberbatch ........ G06Q 40/00 709/206 |
| 8,326,958 | B1 | * | 12/2012 | Raleigh ................. H04L 9/3247 709/223 |
| 8,583,089 | B2 | | 11/2013 | Ramer et al. |
| 9,135,612 | B1 | * | 9/2015 | Proctor, Jr. .......... G06Q 20/381 |
| 9,928,518 | B1 | | 3/2018 | Vippagunta et al. |
| 10,332,142 | B2 | * | 6/2019 | Wagner ............. G06Q 30/0267 |

(Continued)

FOREIGN PATENT DOCUMENTS

EP    1980988 A2 * 10/2008  ............. H04L 12/14

OTHER PUBLICATIONS

Enabling New Mobile Applications with Location Proofs, Saroiu et al., HotMobile 2009, Feb. 23-24, 2009, Santa Cruz, CA, USA.

(Continued)

*Primary Examiner* — David J Stoltenberg
(74) *Attorney, Agent, or Firm* — Maginot Moore & Beck LLP

(57) ABSTRACT

A computer system communicates with sponsors, mobile wireless devices, and wireless service providers to present incentives to wireless device users for accepting offers to interact with sponsor content. The incentive offers provide mobile wireless device accounts with credits that are paid by the sponsors. The system generates ACH messages to obtain payment for the credits and transfers the money to the wireless service providers for partial payment of wireless service charges.

24 Claims, 3 Drawing Sheets

(56) References Cited

U.S. PATENT DOCUMENTS

| | | |
|---|---|---|
| 2003/0046155 A1 | 3/2003 | Himmel et al. |
| 2004/0186770 A1 | 9/2004 | Pettit et al. |
| 2006/0053279 A1* | 3/2006 | Coueignoux ....... H04L 63/0823 713/154 |
| 2007/0011104 A1 | 1/2007 | Leger et al. |
| 2007/0088851 A1 | 4/2007 | Levkovitz et al. |
| 2007/0244752 A1 | 10/2007 | Bayne |
| 2007/0265915 A1* | 11/2007 | Gould ................ H04L 51/38 705/14.14 |
| 2008/0010148 A1 | 1/2008 | Knibiehly et al. |
| 2008/0040265 A1* | 2/2008 | Rackley, III ........... G06Q 20/32 705/40 |
| 2008/0097851 A1 | 4/2008 | Bemmel et al. |
| 2008/0126145 A1* | 5/2008 | Rackley, III ......... G06Q 20/102 455/406 |
| 2008/0168099 A1 | 7/2008 | Skaf |
| 2008/0221925 A1 | 9/2008 | Jones |
| 2009/0075696 A1 | 3/2009 | Kanapur et al. |
| 2009/0088219 A1 | 4/2009 | Bayne |
| 2009/0138302 A1 | 5/2009 | Breznik et al. |
| 2009/0234861 A1* | 9/2009 | Ramer ................ G06F 16/9577 |
| 2010/0106580 A1 | 4/2010 | Etheredge et al. |
| 2010/0106581 A1 | 4/2010 | Etheredge et al. |
| 2010/0125495 A1 | 5/2010 | Smith et al. |
| 2010/0130179 A1 | 5/2010 | Colligan et al. |
| 2010/0287048 A1* | 11/2010 | Ramer ................ G06Q 30/0247 705/14.46 |
| 2011/0029363 A1 | 2/2011 | Gillenson et al. |
| 2011/0055005 A1 | 3/2011 | Lang |
| 2011/0066503 A1 | 3/2011 | Kanapur et al. |
| 2011/0145092 A1 | 6/2011 | Paradise et al. |
| 2011/0145093 A1 | 6/2011 | Paradise et al. |
| 2011/0161149 A1 | 6/2011 | Kaplan |
| 2011/0251892 A1* | 10/2011 | Laracey ............. G06Q 30/0253 705/14.51 |
| 2012/0036003 A1 | 2/2012 | Tong et al. |
| 2012/0089521 A1* | 4/2012 | Abrevaya ............ H04M 15/00 705/75 |
| 2012/0101881 A1* | 4/2012 | Taylor ................... G06Q 30/02 705/14.13 |
| 2012/0143692 A1* | 6/2012 | Packer ............... G06Q 30/0207 705/14.64 |
| 2012/0168498 A1* | 7/2012 | Couper ............... G06Q 20/108 235/379 |
| 2012/0197691 A1 | 8/2012 | Grigg et al. |
| 2012/0203672 A1 | 8/2012 | Morgan et al. |
| 2012/0203673 A1 | 8/2012 | Morgan et al. |
| 2012/0215623 A1 | 8/2012 | Ramer et al. |
| 2012/0215624 A1 | 8/2012 | Ramer et al. |
| 2012/0226530 A1 | 9/2012 | Gebb et al. |
| 2012/0226545 A1* | 9/2012 | Gebb ................ G06Q 30/0207 705/14.27 |
| 2012/0271701 A1 | 10/2012 | Keck |
| 2012/0304255 A1* | 11/2012 | Carnes ................... H04L 63/08 726/3 |
| 2013/0045710 A1 | 2/2013 | Raleigh |
| 2013/0066976 A1* | 3/2013 | Massey ................... H04W 4/50 709/206 |
| 2013/0072149 A1 | 3/2013 | Raleigh |
| 2013/0072150 A1* | 3/2013 | Williamson ............. H04W 4/50 455/405 |
| 2013/0125219 A1* | 5/2013 | Raleigh ................. H04W 28/02 726/5 |
| 2013/0133028 A1* | 5/2013 | Raleigh ............... H04L 41/0806 726/1 |
| 2013/0144789 A1 | 6/2013 | Aaltonen et al. |
| 2013/0179242 A1 | 7/2013 | Kaplan |
| 2013/0179348 A1* | 7/2013 | Crofts .................. G06Q 20/322 705/44 |
| 2013/0191213 A1 | 7/2013 | Beck et al. |
| 2013/0238455 A1 | 9/2013 | Laracey |
| 2013/0246203 A1 | 9/2013 | Laracey |
| 2013/0262209 A1 | 10/2013 | Boyer et al. |
| 2013/0268367 A1 | 10/2013 | Erdogan |
| 2013/0316703 A1 | 11/2013 | Girard et al. |
| 2013/0317911 A1 | 11/2013 | Medlen |

OTHER PUBLICATIONS

Comparison of Different Approaches for Mobile Advertising, Bulander et al., Proceedings of the 2005 Second IEEE International Workshop on Mobile Commerce and Services (WMCS'05).

An overview of mobile ad hoc networks: Application and challenges, Hoebeke et al., Journal—Communications Network, Jul. 2004.

Mobile Commerce: Framework, Applications and Networking Support, Varshney et al., Mobile Networks and Applications; Jun. 2001.

\* cited by examiner

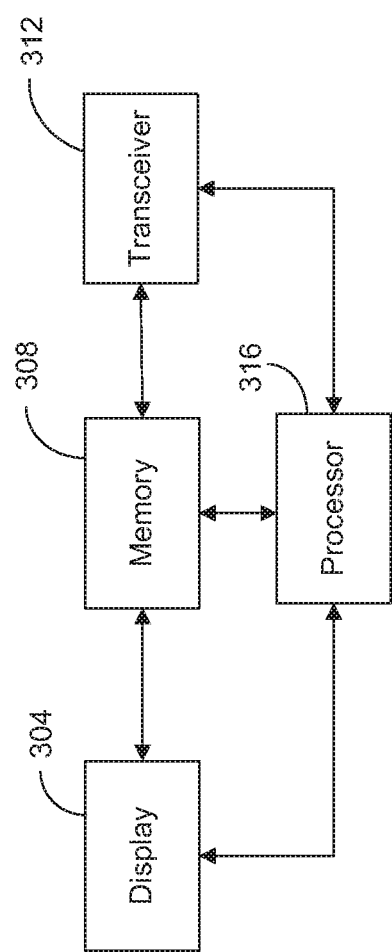

SYSTEM AND METHOD FOR INCENTIVIZING WIRELESS DEVICE USERS TO INTERACT WITH SPONSOR OFFERS AND ADVERTISING

PRIORITY CLAIM

This application is a continuation application and claims priority to pending U.S. patent application Ser. No. 13/829,007, which was filed on Mar. 14, 2013, which is entitle "System And Method For Incentivizing Wireless Device Users To Interact With Sponsor Offers And Advertising," and which issued as U.S. Pat. No. 10,332,142 on Jun. 25, 2019.

TECHNICAL FIELD

This disclosure relates generally to systems for administering wireless device accounts, and more particularly, to systems that enable users to obtain credits on wireless device accounts.

BACKGROUND

Advertisements, which are commonly called "ads," are presented to potential consumers to encourage consideration and purchase of products and services. These ads are presented through a number of media channels, which include television, radio, billboards, magazines and, more recently, the Internet. In exchange for receiving free or subsidized content, the ads are presented in conjunction with or interspersed in the content presented to the viewer. On the Internet, ads most frequently take the form of banner ads that are displayed along with the desired content. These banner ads, however, are frequently ignored by viewers who view the ads as unwanted clutter or worse.

Internet access through mobile wireless devices, such as smartphones, continues to grow. Despite the significant differences in the size of the displays and processing resources between computers and mobile telephones, advertising continues to be presented to mobile users in the banner ad manner. Telephone users are even less likely to view ads on a mobile telephone because, in addition to the display size and processing differences, a smartphone user is typically engaged in a particular task and not merely browsing Internet content. Therefore, the advertising downloaded to a mobile device is viewed as interfering with use of the device. Moreover, ads sent to mobile devices as solicitation calls, whether presented audibly or visually, are viewed as a nuisance and, in some cases, as a violation of the telecommunication laws. Consequently, the barriers to product and service sponsors of having their ads downloaded, reviewed, and actively engaged are significant. Therefore, systems and methods that encourage computer users and mobile device users to accept and interact with advertising are needed.

SUMMARY

A computer system enables sponsors to deliver offers to mobile wireless device users who are incentivized to engage with sponsor content for credits on their wireless service provider accounts. The computer system includes an open network interface configured to receive and transmit messages in an open network communication protocol, a database having a memory in which wireless device account data, sponsor account data, and wireless service provider data are stored, and a computer having a processor and memory in which programmed instructions are stored. The processor operates the computer when the processor executes the programmed instructions to verify messages received through the open network interface are from one of a wireless device account holder, an sponsor, and a wireless service provider having data stored in the database, generate and send messages to wireless devices associated with wireless device account data stored in the database in response to receipt of a message regarding a first incentive offer from an sponsor having sponsor account data stored in the database, generate and store credit data in wireless device account data in the database associated with wireless devices that responded to a message regarding the first incentive offer in response to messages indicating acceptance of the first incentive offer being received from wireless devices through the open network interface, generate and send a debit message to a payment service associated with the sponsor having sponsor account data stored in the database that sent the first incentive offer, a debit amount identified in the debit message corresponding to a total debit identified by the credit data stored by the computer in the wireless device account data in the database, and generate and send payment credit messages to a wireless service provider having wireless service provider data stored in the database, the payment messages being generated with reference to the credit data stored in the database for wireless devices that sent messages indicating acceptance of the incentive offer and the payment messages identifying wireless device accounts with the wireless service provider that correspond to wireless devices that sent messages indicating acceptance of the first incentive offer.

A mobile wireless device communicates with the computer system to register mobile wireless device accounts for the opportunity to consider sponsor content in return for credits on their wireless service provider accounts. The mobile wireless device includes a display, a memory in which programmed instructions are stored, a wireless transceiver, and a processor that operates the wireless device when the processor executes the programmed instructions stored in the memory to receive with the transceiver and display messages regarding incentive offers received from a computer communicating over an open network, generate and send with the transceiver requests to receive a document stored at a universal resource locator identified in a received message regarding an incentive offer, and generate and send to the computer communicating over the open network a request for credit to a wireless device account identified by wireless device account data stored in a database associated with the computer.

BRIEF DESCRIPTION OF THE DRAWINGS

FIG. 3 is a block diagram of a mobile wireless device that enables a user to communicate with the computer system of FIG. 2.

DETAILED DESCRIPTION

Figure 1:
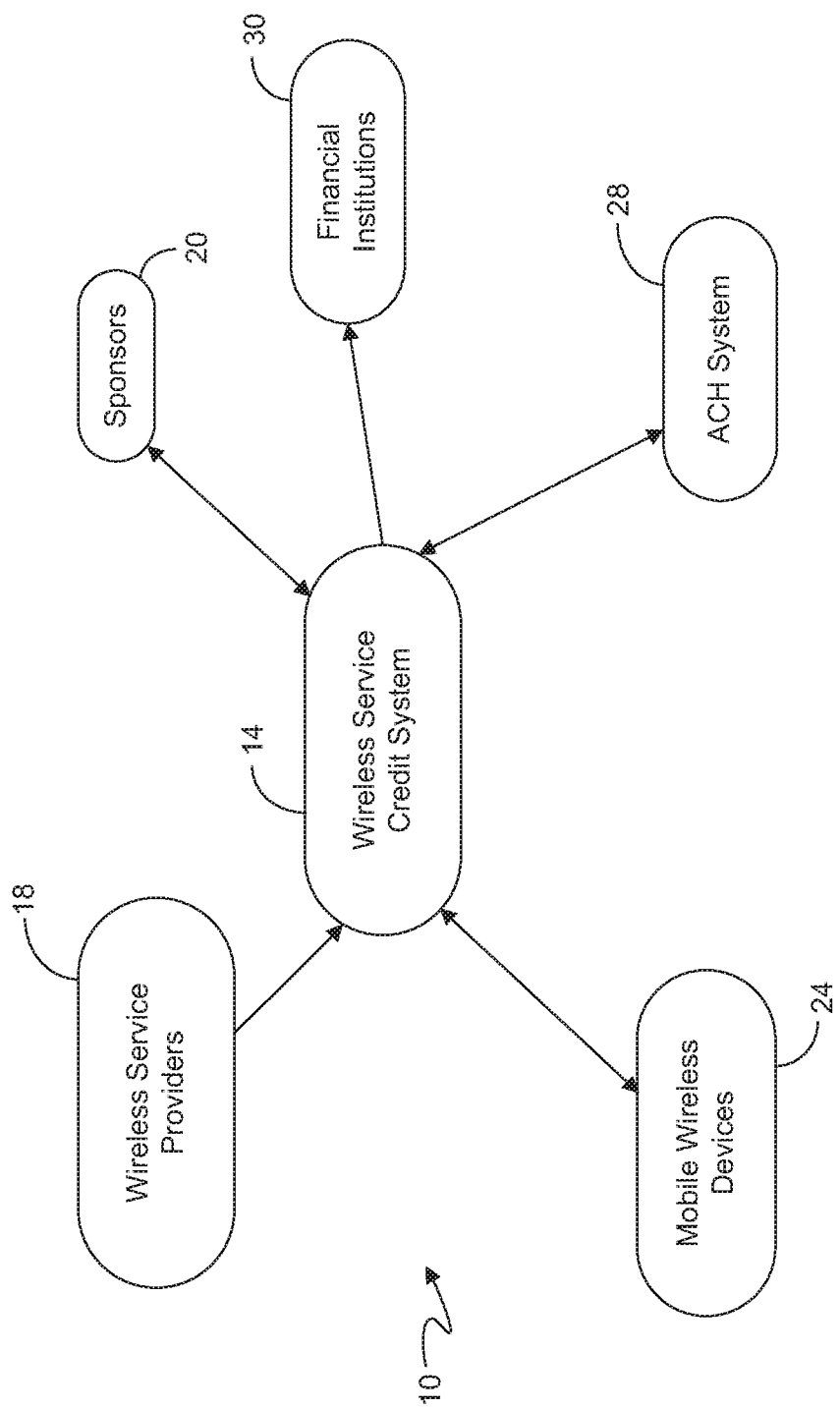
FIG. 1 is a topological view of a network in which incentive offers to interact with sponsor content are managed.

FIG. 1 shows a topology of a network 10 in which incentive offers to interact with sponsor content are generated, distributed, and processed if accepted. A wireless service credit system 14 is operatively connected as an interchange between wireless service providers 18, sponsors 20, mobile device users 24, an automated clearinghouse (ACH) network 28, and financial institutions 30. As used in this document, "system" refers to a computer having one or more processors that are operatively connected to one or more memories in which programmed instructions are stored and these programmed instructions cause the processors executing the instructions to perform tasks or functions or causes the processors to operate one or more electronic components to perform tasks or functions. The system 14 performs a number of functions to obtain consent from mobile wireless device users for receiving and considering interaction with sponsor content. Exemplary functions include registration of consenting mobile device users and devices with the system 14, enrollment of sponsors with the system 14 to obtain access to the registered wireless devices and users, negotiation of offers and incentives between wireless device users and sponsors, and management of wireless account credits for interacting with sponsor content including obtaining payment for the credits from the sponsors and settlement of credits with the wireless service providers. These functions are described in more detail below.

Figure 2:
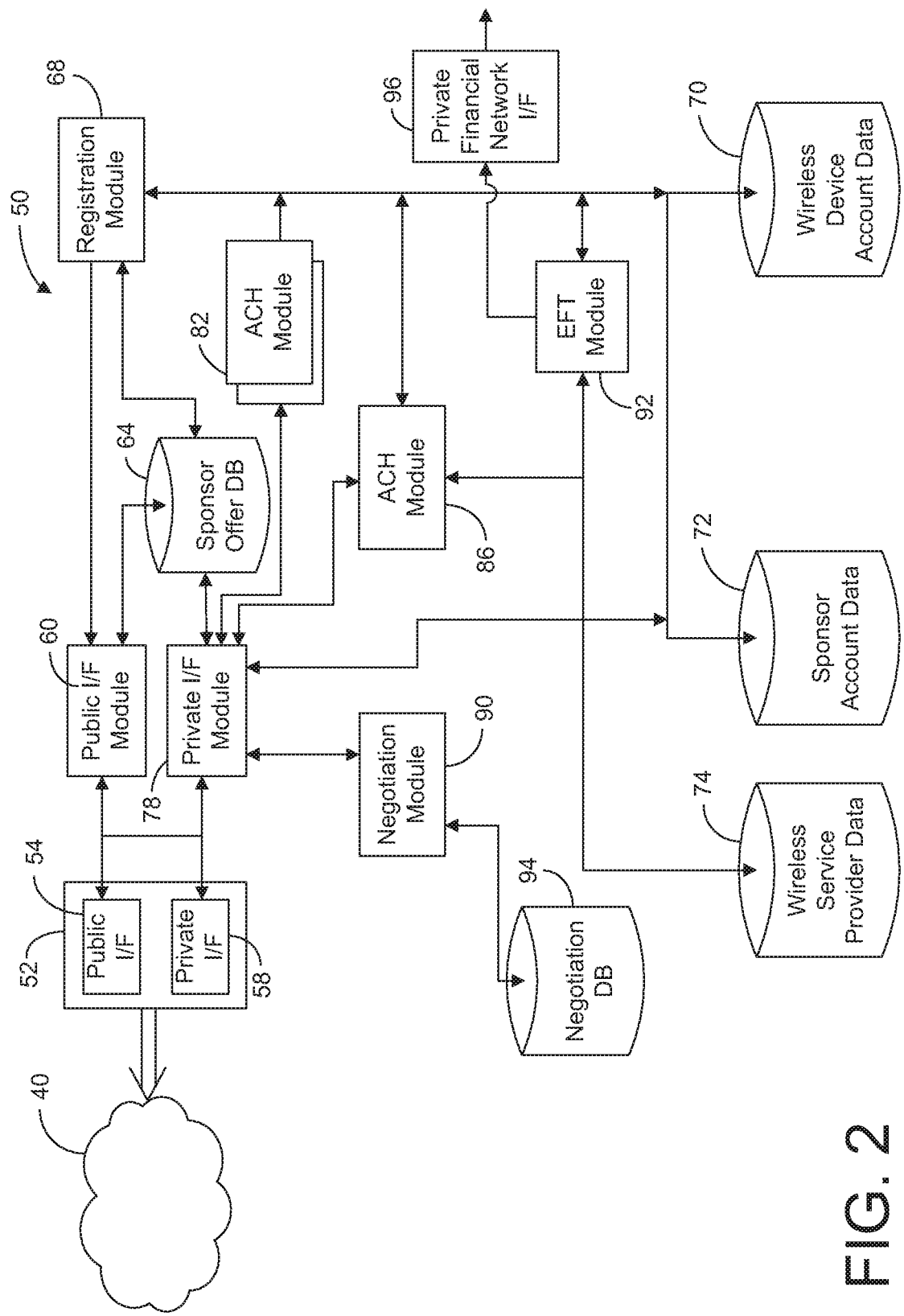
FIG. 2 is a block diagram of a computer system that can be used to manage the incentive offers in the network of FIG. 1.

An exemplary wireless service credit system 50 that can be used to perform the tasks noted above is shown in FIG. 2. System 50 can be implemented on known computer system hardware used to host and operate software such as web servers, database servers, and server applications using operating systems such as UNIX and Microsoft Windows Server. Such hardware includes multiple processor cores, 4 Gigabytes or more of memory, and 100 Gigabytes or more of disk storage capacity. In an overview of the system 50, a public interface 54 and a private interface 58 manage communications between unregistered viewers and registered users, respectively, with the system 50. The unregistered viewers can view a list of sponsors associated with the system 50 and some of the offers that are being presented to mobile wireless device users registered with the system 50. Sponsors include smartphone application vendors, gaming platforms, media content providers, retailers, eCommerce merchants, wireless service providers, and advertisers. These sponsors, as described in more detail below, contract with the system 50 to send incentive messages to some or all of the mobile wireless devices registered with the system. In the registering process, the sponsors provide data identifying the sponsor and providing payment service data by which the sponsor pays for credits to mobile wireless device accounts and for services performed by the system 50. These data are stored in the sponsor account database 72. These incentive messages are offers to download and review advertising, download and install application programs, listen and/or buy media content, preview games, or visit wireless service provider stores, for example, in exchange for a credit on the device's wireless service account.

The system 50 operates the registration module 68 to obtain identifying information from a mobile wireless device that are stored in the wireless service account database 70. These data include the mobile telephone number associated with a mobile wireless device that is provided service by one of the wireless service providers having data stored in the wireless service provider database 74, a unique username entered by the user, and a password also entered by the user. Thereafter, the user enters the username and password in an object displayed by the private interface module 78 on the public interface 54 and, once the module 78 confirms that the username and password are stored in the wireless device account database 70, offer messages can be sent to the mobile wireless device associated with the username and password through the private interface 58.

Offers are viewed by the user and acceptance messages are obtained through the private interface 58. Acceptance messages include messages between a mobile wireless device and the system 50 that indicate the user has accepted the terms of an offer, complied with the conditions of the offer, such as providing use data, registering with the system 50, downloading and reviewing advertising, downloading, installing, or using an application program, listening to and/or buying media content, previewing or playing a game, or visiting a wireless service provider brick-and-mortar store. Upon receipt of an offer acceptance message from a mobile wireless device, the credit module 82 generates and stores a pending credit in the wireless device account database for the wireless device associated with the username in an acceptance message. Upon receipt of a message indicating compliance with the offer conditions, the credit module 82 changes the pending credit status to an earned credit status and generates a charge message that identifies the amount of the credit corresponding to the conditions of the accepted offer and the sponsor of the offer. On a periodic basis, the ACH module 86 receives and stores these charge messages. These charge messages are typically aggregated for each sponsor and, on a daily basis, the ACH module 86 generates an ACH debit message that is transmitted to the payment service identified by the data stored in the database 72 for the sponsor. Upon receipt of the ACH debit message, the payment service generates messages that transfer money in the amount of the aggregated credits for a sponsor identified in a debit message to an account associated with the operator of the system 50. Upon the expiration of a predetermined time period following transmission of the ACH messages, the money transfers are presumed settled and the ACH module 86 sends a message to the credit module 92 to that effect. The credit module 92 then changes the earned credits to paid credits.

After logging onto the system 50, a user can communicate with the system 50 through the interface 58 to view the pending, earned, and paid credits stored in the user's account. The user can also view the charges due in the user's wireless service account either by viewing them directly through the website operated by the wireless service billing platform or, if the user is logged into the system 50, the private interface module 78 can generate and send account queries for the user's account to the wireless service billing platform identified in the wireless service provider data stored in the database 74. These queries can be sent over the open network 40 through the private interface 58 or through a point-to-point network between the billing service platform and the system 50. As credits reach a minimum amount that a wireless service provider indicates is acceptable and the user authorizes the application of the credit, as described more fully below, the credit module 82 sends credit messages for a mobile wireless device account registered with the system 50 to the billing service platform identified by the wireless service provider data stored in the database 74. The user authorizes application of paid credits by selecting paid credits for at least partial payment of a user's wireless account. After viewing the charges on a user's account received in response to an account query, the user can pay some or all of the remaining charges by providing data for a credit card, debit card, payment service, or the like through the private interface 58. These data are transferred by the private interface module 78 to the EFT module 92, which generates electronic funds transfer (EFT) messages that are communicated to a financial institution through the private financial network interface 96 for real time payment of the wireless service charges not settled by the user applied credits. To send payments for the user applied credits, the ACH module 86 sends ACH messages that provide payment from the account associated with the operator of system 50 to an account associated with a wireless service provider. As an alternative to paying the charges on the wireless service account in a real time manner, the user may use a method that is similar to an electronic check. In this alternative payment scheme, the ACH module 86 can also send ACH messages that transfer money from a user's financial institution account, which is identified by data stored in the database 70, to the account identified in the database 74 for the wireless service provider. After the expiration of a predetermined time period following transmission of the ACH messages, which is typically three to five days, the ACH module 86 assumes settlement of the ACH transfers, and the credit module 82 clears the paid credits in the user's account data stored in the database 70 upon the ACH module 86 sending the credit module 82 a message that ACH transfers associated with a user's wireless device account have settled. If the ACH module receives a message indicating a failure of the ACH transfers for insufficient funds, the settlement discrepancy is stored in the user's account data in database 70.

The negotiation module 90 operates in response to a user sending the system 50 a counter-offer message in response to an offer message. The counter-offer message includes a counter-offer to the sponsor. The counter-offer can identify a larger credit for meeting the conditions of the offer or it can change the offer conditions. For example, if a sponsor requires a user to enter the zip code and age of the user in a data object for the credit, the user can counter-offer that the user's age, but not the user's zip code, will be provided for the credit. The negotiation module 90 stores the current offer and counter-offer in the negotiation database 94. Once the offer is finalized, the finalized offer is stored in the sponsor offer database 64 and the sponsor account database for use in the credit and settlement process.

In more detail, the network communication interface 52 includes a public interface 54 and a registered user interface 58. Interface 52 and 54 can be implemented on known hardware that operates web server and application software for providing web services to clients over the Internet. The network communication interface couples to an open network, such as the Internet, to enable mobile wireless device users, wireless service providers, and sponsors to communicate data messages with the system 50. The public interface 54 is operatively connected to the public interface module 60. As used in this document, "module" refers to one or more processors that are operatively connected to one or more memories in which programmed instructions are stored and these programmed instructions cause the processors executing the instructions to operate one or more electronic components to perform tasks or functions for a particular purpose. The public interface module 60 operates the public interface 54 in a known manner to manage message communication with modules associated with mobile wireless device users, wireless service providers, and sponsors. For example, the public interface module 60 operates the public interface 54 to communicate with a browser application executing on a mobile wireless device.

The public interface module 60 is operatively connected to one or more databases 64 to provide content to users through the public interface 54. A portion of the content is displayed from the sponsor offer database 64. This database stores data about offers from sponsors that are presented to mobile wireless devices. The sponsor offers are entered in the database 64 by the private interface module 78 as explained in more detail below. The users viewing the offers through the public interface 54 are unable to receive credit for an accepted offer until the user provides the system 50 with the data required to open an account with the system. Thus, a viewer can peruse the offers and a list of sponsors to ascertain whether the user thinks registration with the system 50 and interaction with the sponsors through the system 50 looks promising for reducing the service charges for the user's mobile wireless device account.

The registration module 68 communicates with mobile wireless devices through the public interface 60 to present offers to mobile wireless device users to register with the system 50 for the purpose of receiving sponsor offers. In response to a user sending a message indicating willingness to register with the system 50, the registration module 68 sends a message with a data object to the user. The data object has required fields for entry of a username, a password, wireless service provider identification and the mobile telephone number (MTN) associated with the mobile wireless device. The data object can include fields for other demographic data, such as age, income range, race, gender, zip code, and the like. These fields, however, may be voluntary fields since some users may decide not to return the data object if too much personal information is required. The users may request and receive a data object in which the users can identify the sponsors from which the user wants to consider offers. Such a list may be exclusive, that is, the user does not want to see offers from other sponsors, or it may be merely indicative of preferences for particular sponsors without excluding offers from other sponsors. Additionally, the user may identify by a data object constraints on offers to be considered. For example, a user may require that only offers of a minimum credit amount will be considered. These data are used by the private interface module 78 to verify the sponsor offers presented to the user from the database 64 conform to the requirements provided by the user. Once the data objects containing these data fields are received, then the registration module 68 stores these data into the wireless device account database 70 to register a user's mobile wireless device account with the system 50. Prior to storing the data in the database 70, registration module 68 can verify that the MTN is a valid account with the wireless service provider identified by the user by accessing the data in the wireless service provider database 74.

Once the registration module 68 has registered the mobile wireless device account with the system 50, the module 68 generates data identifying the accounts that requested particular sponsors and some or all of the demographic data provided in the registration process. These data are stored in the sponsor account database 72 to enable the sponsors to target offers likely to be appealing to users with particular demographic traits or who have identified certain sponsors as preferred offer sources. For those sponsors that require the downloading of an application program associated with the sponsor, the registration module sends a message to the mobile wireless device that directs the user to the sponsor's website. The user can retrieve the application program from the sponsor website for installation. The sponsor's website sends a message to the system 50 that identifies the user's mobile wireless device and indicates the sponsor's application program has been downloaded. Additionally, the registration module 68 can also send one or more data objects to a mobile wireless device to obtain the user's consent as to the type of content the user is willing to accept. These content types include emails, SMS messages, and/or HTML ads associated with incentive offers. These data are also stored in the database 70 and these data are used to verify that offers presented to a user comply with the user's requirements for offers. In return for a user identifying a sponsor as an exclusive or preferred sponsor, the sponsor can provide a credit to the user. This credit is stored in the user's account and later processed as described below.

Once a user has registered with the system 50, the user from time to time logs onto the system and communicates with the system through the private interface 58. Upon login, the private interface module 78 presents a menu to the user for navigation through the system. The choices in the menu include review of the user's account, review of possible sponsor offers, or payment of a user's wireless service provider charges. The user's account data can include pending offers, accepted offers, pending credits, earned credits, paid credits, summaries of activity by sponsor, and the like. In response to a review of possible sponsor offers being selected, the private interface module 78 presents content from database 64 that conform to the requirements that the user has identified and stored in the account database. For example, if the user has identified the sponsors from which the user exclusively considers offers, then only the offers from sponsors corresponding to that list are presented to the user. These offers can be considered, negotiated, or accepted as discussed more fully below. In response to a user selecting payment to a wireless service provider, the private interface module 78 exchanges information with the ACH module 86 and/or EFT module 92 for the generation and transmission of data and messages to transfer funds from the user's payment source to cover the wireless account charges not covered by paid credits and to transfer funds from the account associated with the operator of system 50 for the paid credits the user wants to apply to the wireless account charges as noted above.

In response to a user sending an offer acceptance message to the system 50 through the interface 58, the private interface module 78 stores data corresponding to the conditions of the offer and the pending credit for meeting the conditions of the offer in the wireless device account database 70 associated with the MTN of the user. A time of acceptance is also stored with the data. These time data are used to prevent an offer from staying open indefinitely. As the user meets the conditions of the offer by viewing and/or interacting with the sponsor content specified in the offer, messages are sent by the device operated by a user to meet the offer conditions. For example, as described below, the system 50 can download an application program to a newly registered mobile wireless device to enhance interaction with the system 50. This application program can monitor use of the mobile wireless device and download relevant activity to the system 50 when the user logins to enable the system to update the status of offers stored in the user's account data. In another example, after playing an online version of a game with a particular gaming system, the user can use the gaming system to log onto the system 50 and send a message that the game has been played. After verifying the offer is still open, the private interface module 78 can communicate with the gaming system to confirm that the game has been played.

Following receipt of report data from either a sponsor's website or a user's wireless device regarding performance of offer conditions, the private interface module 78 sends a message to the credit module 82 reporting this action and the credit module updates the user's device account data to indicate the offer conditions have been met and to change the status of the pending credit to earned credit. The credit module 82 also generates a debit in the sponsors account in the database 72 so the ACH module 86 can later generate the ACH messages for transferring money to cover the credit from the sponsor's payment service to the account associated with the operator of the system 50. Alternatively, activity arising from a user's interaction with a sponsor's website can be reported by the website to the system 50 through the private interface 58 with a message identifying the user and the accomplishment of the offer conditions. The ability of the sponsor to correlate the user with an account in the system 50 arises from the user providing a gamer tag or some other identification to the website that is stored with the user's account data in database 70. These data can be provided during registration or in response to incentive offers later sent to the user. Once the system 50 receives the message from the sponsor's website indicating the user has performed the conditions of an offer accepted by the user, the credit module 82 and the ACH module 86 operate as just discussed to store the credit in the user's account and to generate the ACH messages to obtain the funds for the credit from the sponsor's payment service.

Upon receipt of the message indicating compliance with offer conditions, the private interface module 78 accesses the sponsor content to identify whether a follow-on offer is linked to the completed offer. If another offer is linked to the completed offer, the private interface module 78 presents the follow-on offer to the user. The user's response to the follow-on offer is processed by the system 50 in the same manner as described above for sponsor offers. For example, if an offer to listen to a portion of media content is accepted and the portion is heard by the user, a follow-on offer for another credit in exchange for the user recommending the media on some social media site can be sent to the user. A number of offers can be linked to one another so a user that downloads some content, interacts with it, recommends it with social media, and then purchases the content may obtain four credits, one for each step in the process.

Instead of accepting a sponsor offer, a user can send a counter-offer message. The counter-offer message is received by the private interface module 78 and provided to the negotiation module 90. The counter-offer message identifies a larger credit that the user wants for meeting the conditions of the offer or identifies different offer conditions. As noted above, the conditions can alter the type or amount of demographic data the user is willing to share as well as propose new conditions depending upon the conditions identified in the original offer. The negotiation module 90 compares the current offer to a range of acceptable offers that a sponsor provides with offer data that are stored in the sponsor database 72. If the counter-offer is within a range provided by the sponsor, the negotiation module 90 generates a message indicating acceptance of the counter-offer that is sent through the private interface 58 to the user. For example, as noted above, an offer can require the entry of the user's age and zip code. The user may respond with a counter-offer that indicates the user will supply the zip code for a specified partial credit. During the provision of the offer data to the system 50, the sponsor can specify that the zip code is worth a first range of credit and the user's age is worth another range of credit. If the counter-offer for providing the zip code is within the range the sponsor identified for the zip code, then the offer is accepted and the negotiation module 90 sends a message indicating acceptance of the counter-offer to the user device. Additionally, the module 90 updates the pending offer data in the user's account data stored in the database 70. If the counter-offer is not within the range previously stored for the sponsor, then the negotiation module 90 generates a message indicating rejection of the counter-offer and possibly, though not necessarily, identifying the range or a number within the range of credit that is acceptable for the zip code alone. This message is sent through the private interface 58 to the user.

Alternatively, the module 90 stores the current offer and counter-offer in the negotiation database 94 and stores data in the sponsor account database 72 indicating a counter-offer has been received. A sponsor logged into the system 50 can view the sponsor account data and request retrieval of the counter-offer. If the sponsor accepts the counter-offer, a message indicating acceptance is sent by the sponsor to the negotiation module 90 through the private interface 58 and the private interface module 78. Otherwise, a counter-offer message from the sponsor is received by the negotiation module 90 and stored in the database 94. When the user logs into the system 50 and requests the status of the counter-offer proposed by the user, the sponsor counter-offer is sent to the user. This cycle repeats until either the user or the sponsor accepts a counter-offer or one of the user and the sponsor rejects a counter-offer without sending a counter-offer message. Once a counter-offer is accepted, the accepted offer is stored in the sponsor offer database 64 and the sponsor account database 72 for use in the credit and settlement process.

In a manner similar to that discussed above for registration of a wireless device user's account with the system 50, the registration module 68 operates to store data in the sponsor account database 72 to register a sponsor with the system. In addition to credentials similar to those noted above for a user logging into the system 50, a sponsor needs to identify a payment service to enable the system 50 to obtain the funds necessary to cover the credits given to users for interacting with sponsor content in accordance with accepted incentive offers. Thereafter, a sponsor can log onto the system 50 through the private interface 58. In response, the private interface module 78 presents a menu to the sponsor for navigation through the system. The choices in the menu include review of the sponsor's account, requests for data mining of the data collected from the conditions of the offers being met, and posting of incentive offers. The sponsor's account data can include pending offers, accepted offers, performed conditions, negotiated offers, payments for credits earned by users, and the like. In response to a request for mining of the collected data, the private interface module 78 retrieves the records stored in the sponsor account data associated with completed offers. The corresponding wireless device accounts are then accessed to retrieve the demographic and other data collected during performance of the offer conditions. Various statistical measurements can be conducted with reference to these data and provided in report form to the sponsor.

When a sponsor selects the menu item of posting incentive offers, the sponsor downloads the incentive offer conditions with the credit(s) for meeting one or more of the conditions along with any user qualifying data for presentation of the offer. User qualifying data include age, gender, income, area codes, and the like that a sponsor may identify to target one or more groups for a particular offer. Additionally, if one or more users have a history with interacting with a sponsor's content, the sponsor can identify MTNs or usernames for the presentation of an offer. These user criteria are stored in the sponsor content database 64 and are accessed and verified against data stored in a user's wireless device account data before an offer is presented to a user. The sponsor can also send messages to link offers in the manner described above and these data are stored in the sponsor account data and the sponsor content database 64.

In a manner similar to that discussed above for registration of a wireless device user's account with the system 50, the registration module operates to store data in the wireless service provider database 74 to register a wireless service provider with the system. In addition to the wireless service provider sending credentials, similar to the ones noted above for a user or sponsor logging into the system 50, a wireless service provider needs to identify an account to which the system 50 can direct electronic funds to pay wireless service charges for the accounts having data stored in the database 70 of the system 50. These data for the wireless service provider are stored in the database 74. The wireless service provider also provides the system 50 with data to authorize access by the system 50 to any billing platform used by the wireless service provider. This access is used to query for user account data and to generate messages for payment of user charges and to pay for credits on user accounts. Once the data for the wireless service provider are stored in the database 74, a wireless service provider can log onto the system 50 and communicate with the system through the private interface 58. In response, the private interface module 78 presents a menu to the wireless service provider for navigation through the system. The choices in the menu include review of the provider's account and posting of conditions for applying credits to a user's charges. The provider's account data can include the daily settlement amounts paid to the provider, the data stored in the database 74 used by the system 50 to access the billing platforms, and the like. In response to a posting for conditions to apply credits, a wireless service provider can identify the minimum credit that the provider will accept as partial payment for charges to a user's account.

Use of credits and payment of wireless service charges are implemented in the following manner. Each day, the ACH module 86 receives and stores charge messages generated by the credit module 82 for the earned credits stored in the wireless device account database 70. These charge messages are stored in association with each sponsor. Once a day, the ACH module 86 computes an aggregate amount that covers all of the credits the credit module 82 identified as being earned in the database 70 in response to the conditions for offers associated with a particular sponsor being performed. An ACH debit message for that aggregate amount is generated by the ACH module 86 and transmitted to the payment service identified by the sponsor's account data in database 72. The payment service generates ACH messages that result in money for the aggregate credit amount being transferred to an account associated with the operator of the system 50. In this manner, the sponsors pay for access to and contact with the mobile device users for the accounts identified by the data in database 70. The system 50 considers the ACH transfers as being settled upon the expiration of a predetermined period of time following transmission of the ACH messages. At the expiration of that time period, the ACH module 86 sends a message to the credit module 82 to change an earned credit to a paid credit. If the ACH module 86 receives a return message for payment of the credits within the predetermined time period, the credit module 82 does not update the status of the credits to paid credits.

As noted above, a wireless service provider authorizes the system 50 to access the wireless service provider's billing platform to obtain the service charges for mobile wireless devices receiving service from the provider. Once earned credits have been paid by the sponsor to the operator of the system 50 and the user logs on to request use of paid credits against the user's account, the credit module 82 generates and sends messages to the wireless service provider's billing platform identifying the paid credits the user is applying to the user's account to adjust the charges to a mobile wireless device account registered with the system 50. Before sending the credit messages, the credit module 82 verifies that the paid credits for an account comply with the minimum amounts identified by the data stored in the wireless service provider account database 74 before sending the messages to apply paid credits to the billing service platform. The ACH module 86 also generates and sends ACH messages that transfer funds sufficient to cover the credits from an account associated with the operator of the system 50 to the wireless service provider account identified in database 74. After waiting a predetermined time, settlement of these transfers is presumed and the ACH module 86 sends a message to the credit module 82 to remove the paid credits from the user's account data.

Wireless account charges can be viewed by the user and paid through the private interface 58 by use of a credit card, debit card, payment service, electronic check, or the like. Alternatively, a user can view and pay the charges directly through the billing service platform website. When system 50 is used to pay the wireless account charges and a real time method of payment is selected, the EFT module 92 either obtain information about the user's payment source from a data object communicated with the user through the private interface 58 or from data stored in the user's account data in database 70. The EFT module then generates EFT messages that are communicated with financial institutions through the private financial network interface 96 for the transfer of money from the user's payment source to the wireless service provider's account. If the electronic check or other ACH payment method is selected, the ACH module 86 generates ACH messages for sending payment to an account associated with a wireless service provider from the user's financial institution account either identified by the user's data stored in database 70 or received from the user in a data object communicated with the user through the private interface 58. Settlement of the transfer between the wireless service provider and the payment source selected by the user to pay the account charges is determined by the wireless service provider.

The system 50 communicates with the sponsors, mobile wireless device users, and wireless service providers through an open network 40, which is any computer communication network that supports an open network protocol. Thus, the public interface 54 and the private interface 58 communicates messages over the open network 40 using known open network protocols, such as TCP/IP with HTTP and HTML. The open network can also be operatively connected to an automatic clearinghouse (ACH) network that is well known and used for the communication of ACH messages between financial institutions. Alternatively, the system 50 can be operatively connected through the private financial network interface 96 to a point-to-point communication path to a financial institution for a real time payment method. System 50 can communicate with the sponsors, wireless service providers, and mobile wireless devices over the open network using known encryption methods. Additionally, system 50 can communicate over one or more private point-to-point networks with a wireless service provider billing platform, for example.

The mobile wireless device can be configured to facilitate interaction with the system 50. A block diagram for such a wireless device is shown in FIG. 3. The mobile wireless device 300 includes a display 304, a memory 308 within the device housing in which programmed instructions are stored, a wireless transceiver 312, and a processor 316 that operates the wireless device when the processor executes the programmed instructions stored in the memory. The programmed instructions can be provided to the mobile wireless device as an application program that is downloaded from the system 50 once the user's account has been registered with the system 50. After the application program is installed on the mobile wireless device, the processor operates the transceiver to receive messages regarding sponsor incentive offers from the system 50 that are presented on display 304. Once an offer is accepted, the user can review the content identified in an offer sent by the processor operating the transceiver to generate and send a request to receive a document stored at a universal resource locator identified in the incentive offer. Once the user has reviewed the content, the application program can operate the wireless device to generate and send to the system 50 a request for credit to the wireless device account identified in the database 70. If the document includes a data object in which the user can store data, the processor executing the application program generates and stores identifying data in the data object of the document received from the universal resource locator. The transceiver is then operated to send the document and data object with the identifying data to the system 50.

The application program can be executed by the processor in the wireless device to generate and send messages to the system 50 that identify a counter-offer for which the user of the wireless device would view the document identified in the incentive offer message. The counter-offer can identify a larger monetary credit or identify the information that the user is willing to provide for the credit in the incentive offer. The application program can also be used to view account information stored in the database 70 by operating the wireless device to generate and send messages to the system 50 that request wireless device account data stored in the database in association with the mobile telephone number for the wireless device.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A computer system comprising:
   an open network interface configured to receive and transmit messages in an open network communication protocol;
   a database having a memory in which wireless device account data, sponsor account data, and wireless service provider data are stored; and
   a computer having a processor and memory in which programmed instructions are stored, the processor operating the computer when the processor executes the programmed instructions to:
   verify messages received through the open network interface that are from wireless devices associated with wireless device account data stored in the database, computers associated with sponsors having sponsor account data stored in the database, and a computer associated with a wireless service provider having data stored in the database, generate and send messages to the wireless devices associated with wireless device account data stored in the database, the messages to the wireless devices requesting data required for authorization of the wireless devices to receive messages regarding incentive offers, store in the wireless device account data in the database data required for authorization of the wireless devices to receive messages regarding incentive offers in response to messages from the wireless devices identifying the data required for authorization of the wireless devices to receive messages regarding incentive offers, send an application program for installation on the wireless devices that responded to the messages requesting the data required for authorization of the wireless devices to receive messages regarding incentive offers, verifying messages received through the open network interface from the wireless devices executing the application program after the application program is installed, the verification being made with reference to the data stored in the database that are required for authorization of the wireless devices to receive messages regarding incentive offers, generate and send messages regarding a first incentive offer to the wireless devices associated with wireless device account data stored in the database in response to receipt of a message regarding the first incentive offer from a computer associated with one of the sponsors having sponsor account data stored in the database, generate and store credit data in the wireless device account data in the database associated with the wireless devices that responded to the messages regarding the first incentive offer in response to messages indicating acceptance of the first incentive offer being received from the wireless devices executing the application program and sending messages received through the open network interface and verified with reference to the data stored in the database that are required for authorization of the wireless devices to receive messages regarding incentive offers, generate and send a debit message to a payment service associated with the sponsor having sponsor account data stored in the database that sent the message regarding the first incentive offer, a debit amount identified in the debit message corresponding to a total debit identified by the credit data stored by the computer in the wireless device account data in the database associated with the wireless devices that responded to the messages regarding the first incentive offer.

2. The computer system of claim 1, the computer being further configured with programmed instructions that operate the computer when executed to:

generate and send ACH messages to transfer funds from a payment service identified by the sponsor account data corresponding to the sponsor that sent the message regarding the first incentive offer to an account associated with an operator of the computer.

3. The computer system of claim 1, the computer being further configured with programmed instructions that operate the computer when executed to:

generate and store credit data in the wireless device account data in the database associated with the wireless devices that responded to the messages requesting the data required for authorization of the wireless devices to receive messages regarding incentive offers.

4. The computer system of claim 1, the computer being further configured with programmed instructions that operate the computer when executed to:

generate and send the messages regarding the first incentive offer to the wireless devices associated with wireless device account data stored in the database with reference to identification data stored in the message regarding the first incentive offer received from the computer associated with the sponsor having sponsor account data stored in the database.

5. The computer system of claim 4 wherein the identification data is one of a wireless device number, an area code, a zip code, a geographical identifier, a demographic identifier, and a wireless service provider identifier.

6. The computer system of claim 1 further comprising:

a communication interface for each wireless service provider, each communication interface being configured to enable data communication between the computer and a billing service platform for the wireless service provider over a point-to-point communication network.

7. The computer system of claim 1, the computer being further configured with programmed instructions that operate the computer when executed to:

generate and send messages regarding incentive offers to wireless devices for which wireless device account data are not stored in the database, generate and send messages requesting data required for authorization of a wireless device to send messages regarding incentive offers identified in the messages regarding incentive offers received by the wireless devices in response to a message from the wireless device not having wireless device account data stored in the database that identifies an incentive offer in one of the messages regarding incentive offers, store data required for authorization of the wireless device to send messages regarding incentive offers identified in the messages regarding incentive offers received by the wireless device in response to a message from the wireless device identifying the data required for authorization of the wireless device to send messages regarding incentive offers identified in the messages regarding incentive offers received by the wireless device.

8. The computer system of claim 1, the computer being further configured with programmed instructions that operate the computer when executed to:

generate and send to the wireless devices that sent a message indicating acceptance of the first incentive offer messages regarding a second incentive offer from the sponsor for the first incentive offer, the second incentive offer corresponding to the first incentive offer, and generate and store credit data in the wireless device account data in the database associated with the wireless devices that sent a message indicating acceptance of the second incentive offer in response to the messages regarding the second incentive offer sent to the wireless devices.

9. The computer system of claim 8, the computer being further configured with programmed instructions that operate the computer when executed to:

generate and send to the wireless devices that sent the message indicating acceptance of the second incentive offer additional messages, each additional message identifying a single additional incentive offer from the sponsor for the first and the second incentive offers, each message identifying a single additional incentive offer being sent in response to a message indicating acceptance of the message identifying a previously sent single additional incentive offer, and each additional incentive offer corresponding to the first incentive offer, the second incentive offer and the single additional incentive offers previously sent, and generate and store credit data in the wireless device account data in the database associated with the wireless devices that send messages indicating acceptance of any additional incentive offer, credit data being generated and stored in the wireless device account data in response to each message indicating acceptance of one of the single additional incentive offers.

10. The computer system of claim 1, the computer being further configured with programmed instructions that operate the computer when executed to:

generate and send to the sponsor of the first incentive offer a message indicating a counter-offer for accepting the first incentive offer, the counter-offer being identified by a message received from one of the wireless devices that received one of the messages regarding the first incentive offer, generate and send to the wireless device that sent the identified counter-offer a message indicating either acceptance of the identified counter-offer in response to the computer receiving from the computer associated with the sponsor of the first incentive offer a message indicating acceptance of the identified counter-offer received from the wireless device, or a message indicating rejection of the identified counter-offer, and generate and store credit data in the wireless device account data in the database associated with the wireless device that sends the message identifying the counter-offer in response to receipt of the message indicating acceptance of the counter-offer from the computer associated with the sponsor of the first incentive offer, the credit data being generated with reference to the identified counter-offer.

11. The computer system of claim 10, the computer being further configured with programmed instructions that operate the computer when executed to:

generate and send to the wireless device that sent the message identifying the counter-offer a message identifying a counter-offer from the sponsor of the first incentive offer in response to receipt of a message from the computer associated with the sponsor that identifies the counter-offer from the sponsor, and generate and store credit data in the wireless device account data in the database associated with the wireless device that received the message identifying the counter-offer from the sponsor of the first incentive offer in response to a message from the wireless device indicating acceptance of the counter-offer from the sponsor, the credit data being generated with reference to the counter-offer identified by the message received from the computer associated with the sponsor of the first incentive offer.

12. A wireless device comprising:
a memory in which programmed instructions are stored;
a wireless transceiver; and
a processor that operates the wireless device when the processor executes the programmed instructions stored in the memory to:

receive with the transceiver a message from a computer communicating over an open network that requests data required to authorize the wireless device to receive messages regarding incentive offers from the computer communicating over an open network;

generate and send with the transceiver a message having data that identifies the wireless device and the data requested in the message from the computer communicating over an open network;

receive with the transceiver an application program sent from the computer communicating over an open network;

install with the processor the application program received from the computer communicating over an open network, the processor executing the installed application to:

receive with the transceiver messages regarding incentive offers received from the computer communicating over an open network, generate requests having the wireless device identification data to receive a document associated with a sponsor identified in a received message regarding an incentive offer and operate the transceiver to send the requests, generate a request having the wireless device identification data for credit to a wireless device account identified by wireless device account data stored in a database associated with the computer communicating over the open network and operate the transceiver to send the request for credit to the computer communicating over the open network after the document associated with the sponsor identified in the received message regarding the incentive offer has been received by the wireless device; and generate messages having the wireless device identification data that request wireless device account data stored in the database that are associated with the wireless device identification data with which the wireless device is configured and operate the transceiver to send the messages that request wireless device account data to the computer communicating over the open network.

13. The wireless device of claim 12, the processor executing the installed application program further causing the wireless device to:

generate messages having the wireless device identification data that identify a credit for which a user of the wireless device would view the document associated with the sponsor identified in the received message regarding the incentive offer, and operate the transceiver to send the messages that identify the credit to the computer communicating over the open network.

14. The wireless device of claim 12, the processor executing the installed application program further causing the wireless device to:

generate and store identifying data in the document associated with the sponsor identified in the received message regarding the incentive offer; and operate the transceiver to send the document with the identifying data to the computer communicating over the open network.

15. The wireless device of claim 12, the processor executing the installed application program further causing the wireless device to:

generate a message having the wireless device identification data indicating a counter-offer for accepting one of the incentive offers and operate the transceiver to send the message indicating a counter-offer to the computer communicating over the open network, generate a request having the wireless device identification data to view the document associated with the sponsor identified by the message regarding the one incentive offer in response to the transceiver receiving a message indicating acceptance of the counter-offer from the computer communicating over the open network, generate a request having the wireless device identification data for credit to a wireless device account identified by wireless device account data stored in a database associated with the computer communicating over the open network, the requested credit corresponding to the counter-offer, and operate the transceiver to send the request for credit to the computer communicating over the open network.

16. The wireless device of claim 15, the processor executing the installed application program further causing the wireless device to:

generate the message having the wireless device identification data indicating the counter-offer for accepting the one incentive offer to identify a credit being at least one of a monetary amount and a list of identifying data to be given in response to accepting the one incentive offer.

17. The wireless device of claim 12, the processor executing the installed application program further causing the wireless device to:

receive with the transceiver a data object in the message from the computer communicating over an open network, the data object including fields for the data required to authorize the wireless device to receive messages regarding incentive offers from the computer communicating over an open network;

generate and send with the transceiver the message having data that identifies the wireless device, the message including the data object with data stored in at least one of the fields in the data object.

18. The wireless device of claim 17, the processor executing the installed application program further causing the wireless device to:

store data in fields of the data object that identify parameters for incentive offers to be received from the computer communicating over the open network before sending the message that includes the data object to the computer communicating over the open network.

19. The wireless device of claim 17, the processor executing the installed application program further causing the wireless device to:

identify at least one of the fields in the data object as a required field for data entry; and identify at least one of the fields in the data object as a field for voluntary data entry.

20. The wireless device of claim 14, the processor executing the installed application program further causing the wireless device to:

generate and store the identifying data in a data object in the document received associated with the sponsor identified in the received message; and operate the transceiver to send the document with the identifying data in the data object to the computer communicating over the open network.

21. A wireless device comprising:

a memory in which programmed instructions are stored;

a wireless transceiver; and a processor that operates the wireless device when the processor executes the programmed instructions stored in the memory to:

receive with the transceiver a message from a computer communicating over an open network that requests data required to authorize the wireless device to receive messages regarding incentive offers from the computer communicating over an open network;

generate and send with the transceiver a message having data that identifies the wireless device and the data requested in the message from the computer communicating over an open network;

receive with the transceiver an application program sent from the computer communicating over an open network;

install with the processor the application program received from the computer communicating over an open network, the processor executing the installed application to:

receive with the transceiver messages regarding incentive offers received from the computer communicating over an open network;

identify an incentive offer in a message received from the computer communicating over the open network as being associated with a wireless service provider;

generate a request having the wireless device identification data to receive a document identified in the received message regarding the incentive offer associated with the identified wireless service provider and operate the transceiver to send the request;

generate a request having the wireless device identification data for credit to a wireless device account identified by wireless device account data stored in a database associated with the computer communicating over the open network and operate the transceiver to send the request for credit to the computer communicating over the open network after the document identified in the received message regarding the incentive offer associated with the identified wireless service provider has been received by the wireless device;

generate messages having the wireless device identification data that request wireless device account data stored in the database that are associated with the wireless device identification data with which the wireless device is configured and operate the transceiver to send the messages that request wireless device account data to the computer communicating over the open network;

receive with the transceiver messages from the computer communicating over the open network having wireless device account data that is stored in a database connected to the computer communicating over the open network that are associated with the wireless device identification data with which the wireless device is configured; and generate messages that identify paid credits in the received messages having wireless device account data as payment for services received from a wireless service provider and operate the transceiver to send the messages that identify paid credits as payment for services received from the wireless service provider to the computer communicating over the open network.

22. The wireless device of claim 21, the processor executing the installed application program further causing the wireless device to:

generate the messages identifying paid credits for payment for services received from the wireless service provider with data identifying the wireless service provider from which the services were received as being a wireless service provider different than the wireless service provider corresponding to the received document; and operate the transceiver to send the messages with data identifying the wireless service provider from which the services were received to the computer communicating over the open network.

23. The wireless device of claim 21, the processor executing the installed application program further causing the wireless device to:

generate the messages identifying paid credits for payment for services received from the wireless service provider with data identifying the wireless service provider from which the services were received as being the wireless service provider corresponding to the received document; and operate the transceiver to send the messages with data identifying the wireless service provider from which the services were received to the computer communicating over the open network.

24. The wireless device of claim 21, the processor executing the installed application program further causing the wireless device to:

generate the messages identifying paid credits for payment for services received from the wireless service provider with data identifying the wireless service provider from which the services were received as being a wireless service provider identified in the data requested by the computer communicating over the open network before the application program was sent to the computer communicating over the open network; and operate the transceiver to send the messages with data identifying the wireless service provider from which the services were received to the computer communicating over the open network.

* * * * *

UNITED STATES PATENT AND TRADEMARK OFFICE
CERTIFICATE OF CORRECTION

PATENT NO. : 10,853,834 B2
APPLICATION NO. : 16/447651
DATED : December 1, 2020
INVENTOR(S) : Richard H. Wagner Page 1 of 1

It is certified that error appears in the above-identified patent and that said Letters Patent is hereby corrected as shown below:

On the Title Page

The Assignee item (73) should be listed as Datascape.com, Inc.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*